United States Patent [19]
Combes et al.

[11] Patent Number: 5,714,299
[45] Date of Patent: Feb. 3, 1998

[54] PROCESSES FOR TONER ADDITIVES WITH LIQUID CARBON DIOXIDE

[75] Inventors: James R. Combes, Burlington; Hadi K. Mahabadi, Etobicoke; Carl P. Tripp, Burlington, all of Canada

[73] Assignee: Xerox Corporation, Stamford, Conn.

[21] Appl. No.: 743,271

[22] Filed: Nov. 4, 1996

[51] Int. Cl.⁶ ............................................. G03G 9/107
[52] U.S. Cl. ............................................. 430/137; 427/216
[58] Field of Search ............................. 430/137, 106.6; 423/593, 594, 595, 596; 427/216

[56] References Cited

U.S. PATENT DOCUMENTS

| 5,306,350 | 4/1994 | Hoy et al. | 134/22.14 |
| 5,312,882 | 5/1994 | DeSimone et al. | 526/201 |
| 5,595,850 | 1/1997 | Honjo et al. | 430/108 |

*Primary Examiner*—John Goodrow
*Attorney, Agent, or Firm*—E. D. Palazzo

[57] ABSTRACT

A process which comprises heating at a temperature of from about −60° to about 31° C. a mixture of liquid carbon dioxide, metal or metal oxide, and a surface treating component, and optionally removing carbon dioxide.

32 Claims, No Drawings

PROCESSES FOR TONER ADDITIVES WITH LIQUID CARBON DIOXIDE

PENDING APPLICATIONS

Illustrated in U.S. Ser. No. 740,680, filed pending concurrently herewith, and the disclosure of which is totally incorporated herein by reference, is a process for the preparation of toner additives with supercritical carbon dioxide.

BACKGROUND OF THE INVENTION

This invention is generally directed to a process for the preparation of additives, especially toner additives, and more specifically, the present invention relates to processes for obtaining surface treated metal or metal oxides. In embodiments, the present invention relates to the chemical treatment of metal or metal oxides in a liquid fluid, such as liquid carbon dioxide. The present invention relates in embodiments to the preparation of additives selected for toners, which toners are useful for the development of images in xerographic imaging and printing methods. In embodiments, the present invention more specifically relates to the preparation of toner surface additives wherein the additives are surface treated in a liquid fluid, such as liquid carbon dioxide. Accordingly, in embodiments of the present invention additives, such as silica and titania, are chemically surface treated and/or are treated by physical adsorption in liquid carbon dioxide. This surface treatment can be achieved by using a surface treating reagent of, for example, an organosilane, including nitrogen containing silanes, and halosilane, and wherein after the surface treatment reaction is completed, the carbon dioxide can be quickly removed from the reaction vessel. Thus, with the processes of the present invention no or minimal solvent residue results and there are enabled additive products wherein no or minimal solvent waste exists. Moreover, a number of other advantages are achievable with the processes of the present invention in embodiments thereof, such as no, or minimal change in the resulting powder texture, or morphology of the surface treated additive obtained. The process in embodiments thereof can be considered a one step process and solvents, such as liquid hydrocarbons, halogenated solvents, and water selected for the prior art processes wherein the additives are prepared are avoided. Also, there can be enabled with the processes of the present invention complete and clean removal of the carbon dioxide solvent from the processed additive without costly and cumbersome solvent separation methods. Further, the use of a carbon dioxide medium eliminates the need for solvent disposal since, at atmospheric conditions, carbon dioxide spontaneously separates from solids, thus no or minimal liquid waste is generated. Also, some treating agents or components, such as fluorosilanes, are more soluble in carbon dioxide as compared to their solubility in conventional liquid hydrocarbon solvents.

With liquid fluids, such as carbon dioxide, low temperatures, hence lower pressures can be utilized, for example, from about −40° to about 31° C., and thus the reaction is considered economical, and high yields and excellent purity products can be obtained. Economics are further advanced with liquid carbon dioxide over supercritical carbon dioxide as, at lower pressures, a greater number of reactors becomes available.

The use of supercritical carbon dioxide for the synthesis of polymers by a certain process is illustrated in U.S. Pat. No. 5,312,882, the disclosure of which is totally incorporated herein by reference.

A number of additives for toners are known, such as fumed silicas, metals, metal oxides and the like. These additives, which can be selected as toner additives, especially toner surface external additives, are usually in the form of fine powders with primary particle sizes in the range of from about 5 to about 500 nanometers. Specific examples of toner surface additives are silicon dioxides and titanium dioxides. Their presence on toner surfaces aids in, for example, toner thermoelectric charging while maintaining the needed toner flow characteristics. Many of the toner surface additive particulate oxides, such as titania and silica in the untreated form, contain surface hydroxyl groups which render the material hydrophilic. A hydrophobic external additive is usually necessary to yield a toner with the desired charging and humidity sensitivity characteristics. Surface treatment of the additives, such as oxides, is therefore utilized to cap the surface hydroxyl groups with a nonpolar species, thereby rendering the material hydrophobic and more suitable for use as a toner additive. Two conventional processes for toner additive surface treatment to generate surface treated metal oxides include a gas phase treatment and a conventional noncarbon dioxide liquid solution treatment. In the gas phase treatment, the additive to be treated is contacted with the surface treating reagent of, for example, an organosilane, such as dichlorodimethylsilane (DCDMS), hexamethyldisilazane (HMDS) or chlorotrimethylsilane in the effluent of a furnace in which the oxide was formed. This effluent stream is comprised of the metal or semiconductor oxide entrained in a gaseous stream of air, water, and other reactants and reaction byproducts like silicon tetrachloride, hydrochloric acid and alcohols like methanol. Since the reaction temperatures are relatively high (~400° C. to 150° C.) the reaction between the surface treating reagent and the surface proceeds quickly, in a manner of 0.01 to 0.1 minute. However, this process, as outlined in *Langmuir* 1995, 11, 1858, is limited to volatile reagents and can be slowed by mass transport limitations. Even at relatively high furnace effluent temperatures, many commonly used surface treating reagents, for example octadecyltrichlorosilane (OTS), are unsuitable because of their involatility, thus they are unable to transport to and react with the surface of the oxide. An additional difficulty with gas phase treatment processes is their inability to efficiently undergo process changes. Therefore, a limited range of surface treated, hydrophobic metal oxides is available for use with this methodology.

In existing liquid solution treatment processes, conventional liquid solutions employing solvents, such as methylene chloride, carbon tetrachloride or toluene, are selected (See *Langmuir* 1992, 8, 1120). While these solvents facilitate transport of the surface treating reagent to the metal oxide, the solvent must eventually be separated from the treated oxide product. Therefore, costly and difficult solvent separation steps are needed. An additional difficulty with conventional solution processes is that the solution containing the dispersed oxide can become viscous, retarding the kinetics somewhat thereby resulting in long reaction times. Liquid solutions also present certain health and safety problems in handling and storage. Even after removal of the solvent from the solid product, the texture and morphology of the oxide powder can be adversely altered. Moreover, agglomeration of the oxide powder arising from contact with the liquid can dramatically increase the particle size and the particle size distribution. Therefore, additional grinding and processing equipment is required to provide the material in a free flowing, powdered form amenable to its proper dispersion on toner surfaces.

Therefore, a need exists for a surface treatment process of metals and metal oxide powders in which no solvent separation or purification procedures are required. An additional need resides in processes for the elimination of toxic and/or flammable liquid solvents. Another need is for the avoidance of powder agglomeration or coagulation subsequent to surface treatment. These and other needs and advantages are achievable, it is believed, with the processes of the present invention in embodiments thereof. More specifically, since liquid carbon dioxide is nontoxic and nonflammable, and since it separates completely and spontaneously from suspended solids and yields little or no solid coagulum subsequent to treatment a number of specific advantages are achievable.

SUMMARY OF THE INVENTION

Examples of objects of the present invention in embodiments thereof include:

It is an object of the present invention to provide additives and processes thereof with many of the advantages illustrated herein.

In another object of the present invention there are provided chemical treatment processes for generating toner surface additives.

In yet another object of the present invention there are provided liquid carbon dioxide based processes for the preparation of toner surface additives.

Moreover, in another object of the present invention there are provided economical and substantially waste free processes for the preparation of toner surface additives.

Further, in another object of the present invention there are provided processes for the preparation of toner surface additives wherein conventional liquid solvents and, more specifically, halogenated solvents are avoided.

Another object of the present invention resides in improved processes for the preparation of toner surface additives and toner and developers thereof, and more specifically, one step processes that do not require expensive and elaborate solvent separation methodologies.

Moreover, in another object of the present invention there are provided processes with liquid carbon dioxide for the preparation of surface additives wherein mass transport limitations are avoided or minimized since the carbon dioxide possesses in embodiments a viscosity of from one to two orders of magnitude lower than the prior art conventional liquid solvent based processes.

Also, in another object of the present invention there are provided positively charged toner compositions, or negatively charged toner compositions having admixed therewith carrier particles with a coating thereover.

Embodiments of the present invention relate to processes which comprise heating a mixture of the component to be surface treated, such as an oxide powder and liquid carbon dioxide, which heating is accomplished at a temperature of from about −40° to about 31° C. and preferably from about 0° to about 30° C., maintaining the temperature for an effective time, for example from about 5 to about 60 minutes; adding the surface treating agent, such as hexamethyldisilazane; heating for a further effective time of, for example, from about 10 to about 240 minutes; removing the carbon dioxide by, for example, depressurization from the vapor space and bringing the reactor, when necessary, to about room temperature, about 25° C., by heating if used, and wherein the removed carbon dioxide, which may contain impurities, is isolated and reused.

More specifically, there is provided a process which comprises heating and admixing at a temperature of from about −60° to about 31° C. a mixture of liquid carbon dioxide, metal or metal oxide, and a surface treating component, and optionally removing carbon dioxide; a process for the preparation of toner additives comprised of a core of a metal oxide or a metal, and which process comprises heating at a temperature of from about −60° to about 31° C. a mixture of liquid carbon dioxide and metal or metal oxide, adding a surface treating component, followed by removing carbon dioxide, and optionally heating to room temperature; wherein the admixing is at a temperature of from about 0 to about 31° C., and said admixing is for a period of from about 5 to about 60 minutes; wherein the metal is selected from the group consisting of aluminum, zinc, chromium, iron, titanium, magnesium, copper, and tin; wherein the metal oxide is selected from the group consisting of aluminum oxide, magnetite, zinc oxide, copper oxide, magnesium oxide, titanium dioxide, and silicon dioxide; wherein said admixing is at a temperature of from about −40° to about 31° C., and subsequent to removing carbon dioxide heating is accomplished to about 25° C.; wherein the surface treating agent is an organosilane; wherein the treating agent is hexamethyldisilazane; wherein the treating agent is octadecyltrichlorosilane; wherein the treating agent is dichlorodimethylsilane or decyltrimethoxysilane; wherein the oxide is silicon dioxide, or titanium dioxide; wherein the mass ratio amount of carbon dioxide to metal or metal oxide is about 15:1 to about 25:1; wherein there is selected from about 0.5 to about 70 weight percent of treating agent based on the amount of metal or metal oxide; wherein there is obtained a toner additive of a size diameter of from about 5 to about 500 nanometers; wherein a reactor is selected and the temperature in the reactor is maintained at from about −40° C. to about 30° C.; wherein the reactor contents are stirred with a device operating at a speed of from about 1 to about 200 revolutions per minute; wherein the reactor is depressurized, and wherein subsequent to depressurization the additive product is removed; wherein the metal oxide is fumed silica, or titanium dioxide, and the metal is aluminum; wherein the surface treating component is an organosilane, an organic isocyanate, a carboxylic acid or ester thereof, metal alkoxide or organic alkoxide; wherein the amount of metal or metal oxide, is from about 1 to 300 w/V percent, or about 1 to 300 grams of additive for every 100 milliliters of reactor volume; wherein a reactor vessel is selected and is purged with argon or nitrogen, wherein liquid carbon dioxide is added sufficient to completely immerse the metal or metal oxide in the liquid phase, approximately 85 volume percent, and the surface treating reagent is added in a range amount of from 0.5 to 70 weight percent relative to the metal or metal oxide mass; wherein the product obtained is comprised of a metal oxide core with a hydrophobic surface; wherein the product obtained is comprised of a metal core with a hydrophobic surface; wherein a metal oxide is selected; wherein a metal is selected; wherein said surface treating component reacts with or is physically adsorbed upon the surface of the metal or metal oxide; and a process for the preparation of toner additives comprised of a core of a metal oxide or a metal, and which process comprises mixing at a temperature of from about −60° to about 31° C. liquid carbon dioxide and metal or metal oxide, adding a surface treating component, followed by removing carbon dioxide, and heating, and wherein a metal oxide is selected, or a metal is selected.

Specific embodiments of the present invention include the desired amount, for example from 1 to 100 w/V percent, 1 to 100 grams per 100 milliliters of reactor volume, of the component to be treated, such as a metal or metal oxide, is weighed and placed in a high pressure reactor. The reactor is then sealed and either evacuated or purged with an inert atmosphere (e.g. $N_2$ or Ar). The primary purpose of the purging is to remove from 95 percent to 99 percent of atmospheric water from the reactor. The reactor is then cooled to the desired temperature for the reaction, which with liquid $CO_2$ is in the range of from about −60° C. to about 31° C. Subsequently, the liquid carbon dioxide is then introduced into the vessel via a high pressure pump or compressor. Sufficient carbon dioxide, for example from about 80 to about 90 percent volume percent, is selected to immerse the solid, such as the metal oxide, in the liquid carbon dioxide. Agitation of the resulting dispersion of the oxide in $CO_2$ is then commenced with an impeller at a rotational speed of from about 1 to about 200 rpm, with the preferred speed being from about 10 to about 50 rpm. Gentle agitation (about 10 to about 50 rpm for the duration of the reaction) is generally employed to minimize, or avoid erosive wear of the oxide against the metal surfaces of the reactor. After agitation has commenced, a surface treating reagent, generally an organosilane, but potentially any species that reacts with an alcohol, such as an organic isocyanate, carboxylic acid or ester, metal or organic alkoxide, and the like, is introduced into the carbon dioxide solution via a high pressure pump. The operating pressure range for this addition is from about 40 to about 75 bar, with the preferred range being from about 45 to about 60 bar. Organosilanes are typically used to treat the oxides as they react with surface OH groups to yield a metal or semiconductor atom(surface)-oxygen-silicon treated surface. The reaction byproducts diffuse from the surface and are dissolved in the liquid $CO_2$ solution. The reactor is then maintained at the desired temperature and pressure for from about 5 to 250 minutes. Subsequently, the reactor is slowly depressurized (over a 30 minute time period) via throttling a valve until the pressure inside the reactor reaches atmospheric pressure. An inert atmosphere of, for example, argon is then introduced into the reactor to prevent any atmospheric moisture from being introduced into the system. The reactor is then heated to below 30° C., and more specifically, to from about 25° C. to about 30° C. primarily to prevent condensation onto the components, such as powered oxides, being treated subsequent to removal from the reactor vessel.

Examples of oxides that can be selected for the processes of the present invention include, but are not limited to, iron oxides, zinc oxides, aluminum oxides, silicon oxides, titanium oxides, calcium oxides, magnesium oxide and mixtures thereof. Examples of metals that may be selected include aluminum, zinc, chromium, iron, titanium, magnesium, copper, tin, and the like. The particle sizes of the component to be treated, especially the oxides, range in size diameter from about 5 to about 500 nanometers.

Examples of coating reagents include, but are not limited to, organosilanes including alkyl with, for example, 1 to about 25 carbon atoms, such as octadecyltrichlorosilane or decyltrimethoxysilane, aryl with, for example, 6 to about 30 carbon atoms, such as triphenylchlorosilane, and fluoralkyl, such as (tridecafluoro-1,1,2,2-tetrahydrooctyl)-1-trichlorosilane or (3,3,3-trifluoropropyl)trichlorosilane, organosilanes. Haloalkylsilanes, such as dichlorodimethylsilane, can also be selected. Other treating reagents are alkoxysilanes, organic isocyanates, carboxylic acids or esters and metal alkoxides, and the like, and those silane agents as illustrated in U.S. Pat. No. 5,376,172, the disclosure of which is totally incorporated herein by reference. Products obtained include hydrophobic silica, titania, oxides, and the like with surface properties of the treating reagents listed above.

The surface additives obtained with the processes of the present invention and comprised, for example, of silicon oxides with a layer thereover of the treating component, such as hexamethyldisilazane, can be selected for toner compositions, and wherein there are present resin, especially thermoplastic resin, and pigment. Illustrative examples of finely divided toner resins selected for the toner include known thermoplastics, such as polyamides, epoxies, polyurethanes, diolefins, vinyl resins and polymeric esterification products of a dicarboxylic acid and a diol comprising a diphenol, and extruded polyesters as illustrated in U.S. Pat. No. 5,376,494, the disclosure of which is totally incorporated herein by reference. Specific vinyl monomers that can be used are styrene, p-chlorostyrene, vinyl naphthalene, unsaturated mono-olefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, and the like. Also, styrene butadiene copolymers, mixtures thereof, and other similar known thermoplastic toner resins can be selected.

As one toner resin there can be selected the esterification products of a dicarboxylic acid and a diol comprising a diphenol, reference U.S. Pat. No. 3,590,000, the disclosure of which is totally incorporated herein by reference. Other toner resins include styrene/methacrylate copolymers; styrene/butadiene copolymers; polyester resins obtained from the reaction of bisphenol A and propylene oxide; and branched polyester resins resulting from the reaction of dimethylterephthalate, 1,3-butanediol, 1,2-propanediol and pentaerythritol.

Numerous well known suitable pigments or dyes can be selected as the colorant for the toner particles including, for example, carbon black, nigrosine dye, lamp black, iron oxides, magnetites, and mixtures thereof. The pigment, which is preferably carbon black, should be present in a sufficient amount to render the toner composition highly colored. Thus, the pigment particles are present in amounts of from about 2 percent by weight to about 20, and preferably from about 4 to about 10 percent by weight, based on the total weight of the toner composition.

When the pigment particles are comprised of magnetites, which are a mixture of iron oxides ($FeO.Fe_2O_3$), including those commercially available as MAPICO BLACK®, they are present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment, or colorant, such as a carbon black, is contained therein, about 90 percent by weight of resin material is selected. Generally, however, the toner composition is comprised of from about 85 percent to about 97 percent by weight of toner resin particles, and from about 3 percent by weight to about 15 percent by weight of pigment particles such as carbon black.

Pigments or colorants of magenta, cyan and/or yellow particles, as well as mixtures thereof can also be selected.

More specifically, illustrative examples of magenta materials that may be selected as pigments include 1,9-dimethyl-substituted quinacridone and anthraquinone dye identified in the Color Index as CI 60720, CI Dispersed Red 15, a diazo dye identified in the Color Index as CI 26050, CI Solvent Red 19, and the like. Examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide, phenylazo-4'-chloro-2,5dimethoxy acetoacetanilide, permanent yellow FGL, and the like. These pigments are generally present in the toner composition in an amount of from about 1 weight percent to about 15 weight percent based on the weight of the toner resin particles.

For further enhancing the positive charging characteristics of the toner compositions, and as optional components there can be incorporated herein charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate, and other known charge additives, including negative charge additives, such as BONTRON E-88®, TRH, and aluminum complexes. These additives are usually incorporated into the toner in an amount of from about 0.1 percent by weight to about 20 percent by weight.

The toner composition with an average volume size diameter of from about 5 to about 20 microns can be prepared by a number of known methods including melt blending the toner resin particles, and pigment particles or colorants of the present invention, followed by mechanical attrition. Other methods include those well known in the art such as spray drying, melt dispersion, dispersion polymerization and suspension polymerization. In one dispersion polymerization method, a solvent dispersion of the resin particles and the pigment particles are spray dried under controlled conditions to result in the desired product. Thereafter, there is added to the toner the additives obtainable with the processes of the present invention and which additives are selected in various effective amounts, such as for example from about 0.05 to about 10, from about 0.05 to about 3, and preferably from about 0.9 to about 2 weight percent.

Also, the toner and developer compositions, that is toner and carrier, for example a ferrite, iron, and the like, or a ferrite, iron, and the like coated core, may be selected for use in electrostatographic imaging and printing processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive members, comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines, vanadyl phthalocyanines, titanyl phthalocyanines, his perylenes, gallium phthalocyanines, and the like. As charge transport molecules there can be selected the aryl diamines disclosed in the '990 patent. Moreover, the developer compositions are particularly useful in electrostatographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference; and such developers can be selected for digital imaging apparatuses such as the Xerox Corporation DOCUTECH™.

Images obtained with the developer compositions, that is toner and carrier, illustrated herein will, it is believed, possess acceptable solids, excellent halftones and desirable line resolution with acceptable or substantially no background deposits.

The following Examples are being provided to further illustrate the present invention, it being noted that these Examples are intended to illustrate and not limit the scope of the present invention. Parts and percentages are by weight unless otherwise indicated.

EXAMPLE I

Thirty grams of untreated silica with a surface area of approximately 50 $m^2$/gram, obtained from Degussa Chemicals as OX-50, were placed in a Buechi 2 liter autoclave reactor, and the reactor was sealed. An inert gas, argon, was then purged for 30 minutes through the reactor to remove atmospheric gases. The reactor was then cooled to 0° C. with the aid of a Laude circulating bath connected to the reactor jacket. After achieving a temperature of zero (0)° C., 570 grams of carbon dioxide (bone-dry grade obtained from Praxair) were then added to the chilled reactor with the assistance of an ISCO Model 260D motorized syringe pump. Agitation of the reactor was then initiated at 10 rpm. One milliliter of hexamethyldisilazane, obtained from United Chemical Technologies Inc., was then dissolved in a separate variable volume pressure cell using carbon dioxide as the solvent, and the pressure in the cell was 100 bar, that is sufficient to generate a homogeneous solution of the hexamethyldisazane in the carbon dioxide. This solution was then injected into the Buechi 2 liter reactor.

The temperature was maintained at 0° C. and agitated at 100 rpm for 30 minutes, and the agitation was then removed, and the carbon dioxide was vented off from the upper portion of the reactor, the vapor space. Subsequent to the aforementioned depressurization, the reactor temperature was increased to 28° to 30° C.

After equilibration at the above temperature, the treated product was removed for overnight, about 18 hours, vacuum treatment and spectroscopic characterization.

For spectroscopic characterization, a small amount (500 milligrams) of the treated silica product was placed on a disk of cesium iodide and uniformly smeared over the disk using a glass plate. The disk with the film of treated silica was then placed in an infrared beam of a Bomem Model 102 FTIR spectrometer for characterization. The resultant silica spectrum revealed a complete removal of the "free OH" band at 3,747 $cm^{-1}$ and the presence of hydrocarbon vibrations around 2,900 $cm^{-1}$.

The product resulting was comprised of a silicon dioxide with a trimethylsilyl uniform coating thereover.

EXAMPLE II

The process of Example I was repeated with octadecyltrichlorosilane in place of hexamethyldisilazane, and with substantially similar results.

Spectroscopic characterization was similar to Example I, however, a substantially stronger hydrocarbon absorption band was apparent primarily because of the greater number of $CH_2$ groups with octadecyltrichlorosilane attached relative to hexamethyldisilazane, either via physical adsorption or surface reaction to the silicon oxide core.

The product was comprised of a silicon dioxide with a trimethylsilyl uniform coating thereover.

EXAMPLE III

The process of Example I was repeated with dichlorodimethylsilane instead of hexamethyldisilazane, and with substantially similar results.

The product was comprised of a silicon dioxide with a dimethylsilyl coating thereover.

EXAMPLE IV

The process of Example I was repeated with a silica of 400 m²/gram, and substantially similar results were achieved.

The product was comprised of a silicon dioxide of 400 m²/gram with a trimethylsilyl coating thereover.

EXAMPLE V

The process of Example I was repeated with titanium dioxide of a size of 50 m²/gram instead of silica.

The product was comprised of a titanium dioxide of 50 m²/gram with a trimethylsilyl coating thereover.

EXAMPLE VI

The process of Example V was repeated with 20 weight percent of decyltrimethoxysilane instead of hexamethyldisilazane.

The product was comprised of a silicon dioxide with a decylsilyl coating thereover.

EXAMPLE VII

The process of Example V was repeated with titanium dioxide of a size of 400 m²/gram.

The product was comprised of a titanium dioxide of 400 m²/gram with a trimethylsilyl coating thereover.

EXAMPLE VIII

The process of Example I was repeated for a duration of 240 minutes instead of 30 minutes, and substantially similar results were achieved.

The product resulting was comprised of a silicon dioxide with a trimethylsilyl coating thereover.

EXAMPLE IX

The process of Example I was repeated but with an operating temperature of −10° C. instead of 0° C., and substantially similar results were achieved.

The product resulting was comprised of a silicon dioxide with a trimethylsilyl uniform coating thereover.

EXAMPLE X

The process of Example I was repeated with untreated 50 m²/gram silica, obtained from Degussa Chemicals as OX-50, and wherein instead of a reactor there was selected a 25 milliliter high pressure cell equipped with sapphire windows. The cell was purged, and there was added to the cell 0.26 milliliter of the hexamethyldisilazane in 15 grams of carbon dioxide. The pressure in the cell was measured as being 920 psia. The cell was maintained at these conditions for 120 minutes. After vacuum treatment and spectroscopic characterization, substantially similar results as in Example I were achieved.

The product resulting was comprised of a silicon dioxide with a trimethylsilyl uniform coating thereover.

EXAMPLE XI

The process of Example I was essentially repeated with 40 nanometer diameter size raw titania (Tayca MT-500BW) and 0.8 milliliter of decyltrimethoxysilane.

The product resulting was comprised of a titanium dioxide with a decylsilyl coating thereover.

Other embodiments and modifications of the present invention may occur to those of ordinary skill in the art subsequent to a review of the present application and the information presented herein; these embodiments and modifications, as well as equivalents thereof, are also included within the scope of this invention.

What is claimed is:

1. A process which comprises heating at a temperature of from about −60° to about 31° C. a mixture of liquid carbon dioxide, metal or metal oxide, and a surface treating component, and optionally removing carbon dioxide.

2. A process for the preparation of toner additives comprised of a core of a metal oxide or a metal, and which process comprises heating at a temperature of from about −60° to about 31° C. a mixture of liquid carbon dioxide and metal or metal oxide, adding a surface treating component, followed by optionally removing carbon dioxide.

3. A process in accordance with claim 2 wherein the heating is at a temperature of from about 0° to about 31° C., and said admixing is for a period of from about 5 to about 60 minutes.

4. A process in accordance with claim 2 wherein the metal is selected from the group consisting of aluminum, zinc, chromium, iron, titanium, magnesium, copper, and tin.

5. A process in accordance with claim 2 wherein the metal oxide is selected from the group consisting of aluminum oxide, magnetite, zinc oxide, copper oxide, magnesium oxide, titanium dioxide, and silicon dioxide.

6. A process in accordance with claim 2 wherein said heating is at a temperature of from about −40° to about 31° C., and subsequent to removing carbon dioxide heating is accomplished to about 25° C.

7. A process in accordance with claim 2 wherein the surface treating agent is an organosilane.

8. A process in accordance with claim 2 wherein the treating agent is hexmethyldisilazane.

9. A process in accordance with claim 2 wherein the treating agent is octadecyltrichlorosilane.

10. A process in accordance with claim 2 wherein the treating agent is dichlorodimethylsilane or decyltrimethoxysilane.

11. A process in accordance with claim 2 wherein the oxide is silicon dioxide or titanium dioxide.

12. A process in accordance with claim 2 wherein the mass ratio amount of carbon dioxide to metal or metal oxide is about 15:1 to about 25:1.

13. A process in accordance with claim 2 wherein there is selected from about 0.5 to about 70 weight percent of treating agent based on the amount of metal or metal oxide.

14. A process in accordance with claim 2 wherein there is obtained a toner additive of a size diameter of from about 5 to about 500 nanometers.

15. A process in accordance with claim 2 wherein a reactor is selected and the temperature in the reactor is maintained at from about −40° C. to about 30° C.

16. A process in accordance with claim 15 wherein the reactor contents are stirred with a device operating at a speed of from about 1 to about 200 revolutions per minute.

17. A process in accordance with claim 15 wherein the reactor is depressurized, and wherein subsequent to depressurization the additive product is removed.

18. A process in accordance with claim 1 wherein the metal oxide is fumed silica or titanium dioxide, and the metal is aluminum.

19. A process in accordance with claim 1 wherein the surface treating component is an organosilane, an organic isocyanate, a carboxylic acid or ester thereof, metal alkoxide or organic alkoxide.

20. A process in accordance with claim 2 wherein the amount of metal or metal oxide is from about 1 to 300 w/V percent, or about 1 to 300 grams of additive for every 100 milliliters of reactor volume.

21. A process in accordance with claim 1 wherein a reactor vessel is selected and is purged with argon or nitrogen, wherein liquid carbon dioxide is added sufficient to completely immerse the metal or metal oxide in the liquid phase, and the surface treating reagent is added in a range amount of from 0.5 to 70 weight percent relative to the metal or metal oxide mass.

22. A process in accordance with claim 1 wherein the product obtained is comprised of a metal oxide core with a hydrophobic surface.

23. A process in accordance with claim 1 wherein the product obtained is comprised of a metal core with a hydrophobic surface.

24. A process in accordance with claim 2 wherein a metal oxide is selected.

25. A process in accordance with claim 2 wherein a metal is selected.

26. A process in accordance with claim 2 wherein said surface treating component reacts with or is physically adsorbed upon the surface of the metal or metal oxide.

27. A process for the preparation of toner additives comprised of a core of a metal oxide or a metal, and which process comprises heating at a temperature of from about −60° to about 31° C. liquid carbon dioxide and metal, adding a surface treating component, followed by removing carbon dioxide.

28. A process for the preparation of toner additives comprised of a core of a metal oxide or a metal, and which process comprises heating at a temperature of from about −60 to about 31° C. liquid carbon dioxide and metal oxide, adding a surface treating component, followed by removing carbon dioxide.

29. A process in accordance with claim 27 wherein the metal oxide is selected from the group consisting of aluminum oxide, magnetite, zinc oxide, copper oxide, magnesium oxide, titanium dioxide, and silicon dioxide.

30. A process in accordance with claim 28 wherein the metal is selected from the group consisting of aluminum, zinc, chromium, iron, titanium, magnesium, copper, and tin.

31. A process in accordance with claim 1 wherein the carbon dioxide is removed.

32. A process consisting essentially of heating at a temperature of from about −60° to about 31° C. a mixture of liquid carbon dioxide, metal or metal oxide, and a surface treating component, and optionally removing carbon dioxide.

* * * * *